O. HEINS.
INTERNAL COMBUSTION ENGINE ORGANIZATION.
APPLICATION FILED MAY 26, 1915.
1,198,633.
Patented Sept. 19, 1916.
2 SHEETS—SHEET 1.
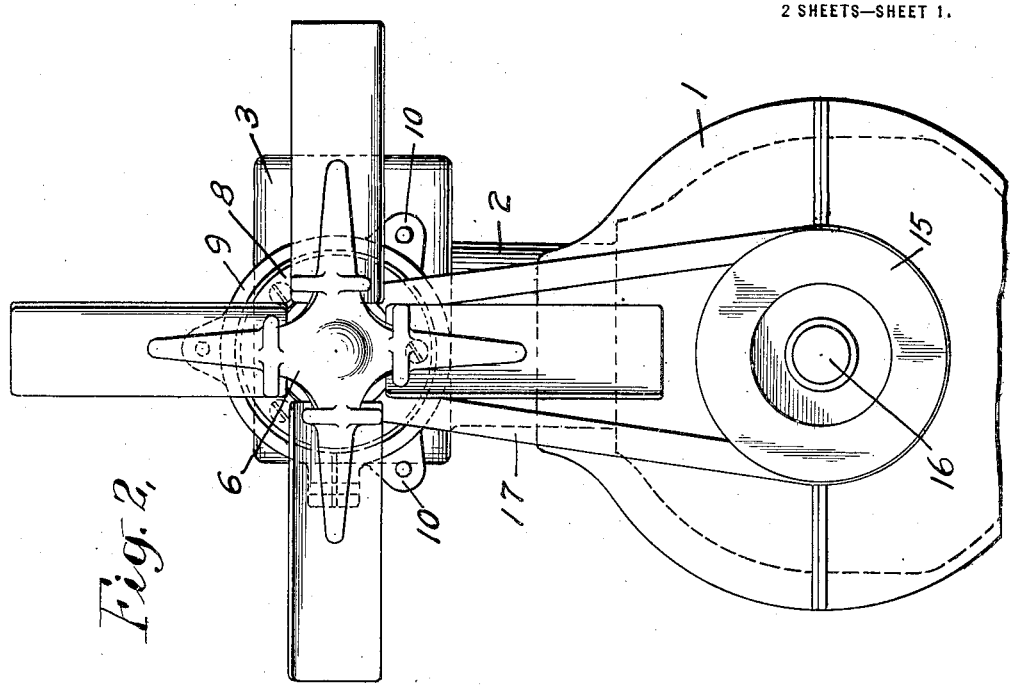
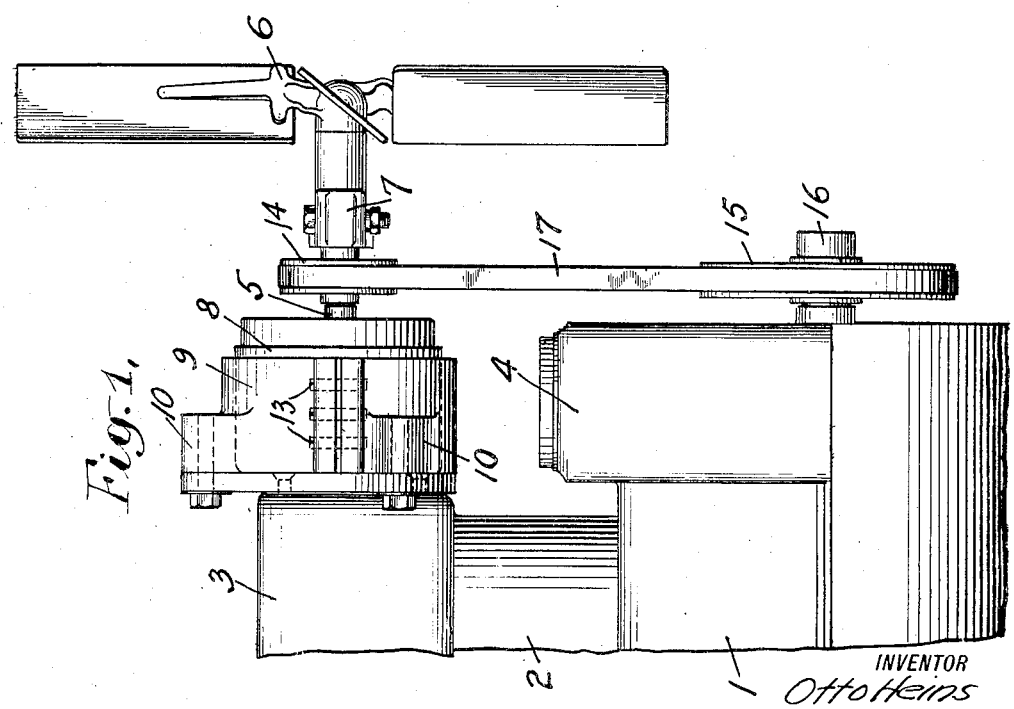
INVENTOR
Otto Heins
BY
Pennie Davis & Marvin
ATTORNEYS O. HEINS.
INTERNAL COMBUSTION ENGINE ORGANIZATION.
APPLICATION FILED MAY 26, 1915.
1,198,633.
Patented Sept. 19, 1916.
2 SHEETS—SHEET 2.
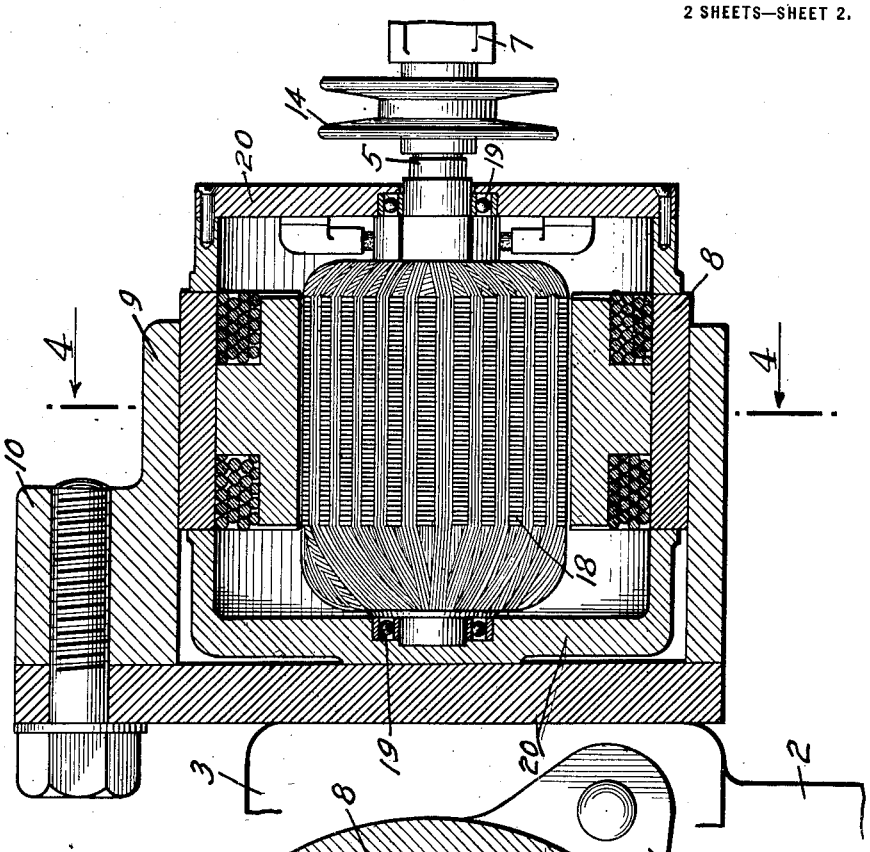
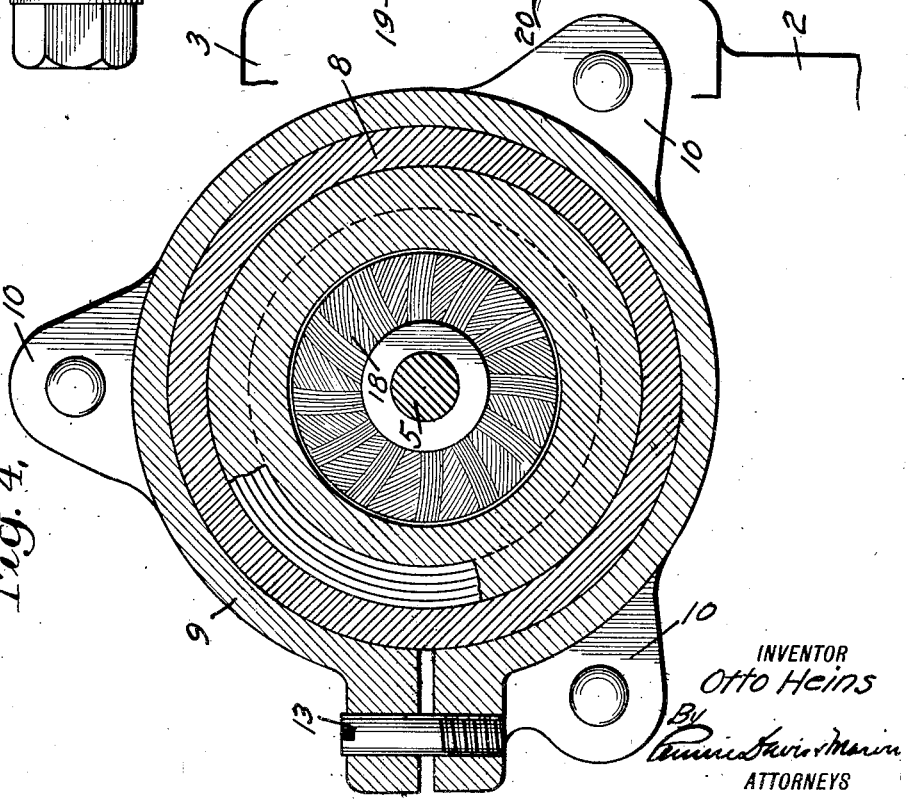
INVENTOR
Otto Heins
ATTORNEYS

UNITED STATES PATENT OFFICE.

OTTO HEINS, OF NEW YORK, N. Y., ASSIGNOR TO BOSCH MAGNETO COMPANY, OF NEW YORK, N. Y., A CORPORATION OF NEW YORK.

INTERNAL-COMBUSTION-ENGINE ORGANIZATION.

1,198,633.             Specification of Letters Patent.      Patented Sept. 19, 1916.

Application filed May 26, 1915. Serial No. 30,584.

*To all whom it may concern:*

Be it known that I, OTTO HEINS, a subject of the Emperor of Germany, residing at and whose post-office address is 336 West Eighty-eighth street, city, county, and State of New York, have invented certain new and useful Improvements in Internal-Combustion-Engine Organization; and I do hereby declare the following to be a full, clear, and exact description of the invention, such as will enable others skilled in the art to which it appertains to make and use the same.

The room in the hood of an automobile is quite limited, and it is therefore essential that the auxiliary apparatus be arranged compactly along the internal combustion engine therein, although certain parts must still be accessible for inspection and repair. To meet these conditions in practice, it is not only necessary to utilize the available space to advantage, but the parts must be small and the driving connections therefor must be few in number, especially since the organization should run quietly. Now in order to eliminate the necessity for an additional driving shaft and bearings therefor, the electric lighting generator is generally driven from the magneto shaft, which extends alongside of the engine, but inasmuch as the magneto turns at engine speed for a four cylinder engine and at one and one-half times engine speed for a six cylinder engine, a belt or gear drive is installed from the magneto shaft to drive the generator at its best speed equal to about two to three times engine speed. Although this speed permits the use of a generator which is small for its output, yet the arrangement has the disadvantage that an additional driving connection is required and also that the generator is located behind or near the bottom of the engine in a heated place away from the cooling action of the fan, and not as accessible as might be desired.

The object of the invention is to provide an internal combustion engine organization in which the lighting generator occupies a readily accessible position in the direct path of air currents from the fan, and is driven at the most desirable speed by the same driving connection that is otherwise required for driving the fan shaft. I attain this object, and thereby obviate the foregoing disadvantages, by supportng the generator at the front of the engine and behind the fan in driving connection with the fan shaft so as to be driven therewith by the fan belt. Preferably, the generator is mounted directly on the inner end of the fan shaft, forming the sole means for supporting the fan in position and replacing the usual fan shaft bearing and the bracket therefor. This arrangement is most desirable since the best speed of the fan coincides substantially with the best speed of the generator, and also since the generator is in line with the valve casing of the engine. Thus, besides simplifying the organization, and rendering the generator and other apparatus less compacted, the generator may be further reduced in size on account of the efficient cooling effect of the fan and also on account of its higher efficiency due to the lower temperature. Furthermore, the organization is simplified and operates more quietly.

These and other advantages will be understood from the following description and appended claims, taken in connection with the accompanying drawings which illustrate the preferred form of the organization within my invention.

In these drawings, Figure 1 is a side elevation of the forward end of the organization; Fig. 2 is a front elevation thereof; Fig. 3 is a sectional elevation through the generator, drawn on an enlarged scale; and Fig. 4 is a section on line 4—4 of Fig. 3.

The internal combustion engine has a crank case 1, cylinders 2, and a valve casing 3, as is customary, and the housing 4 mounted on the crank case may contain gearing or some auxiliary device such as a pump. The fan shaft 5 extends forwardly of the engine in line with the valve casing 3. On the outer end of this shaft is mounted the fan 6 fastened thereto at 7; and on the inner end thereof is mounted the electric generator 8. The generator 8 is supported from the engine by a ring casting 9 having lugs 10 adapted to be fastened to the valve casing 3 of the engine. The ring casting is split so that the screws 13 may clamp it securely around the generator and hold the shaft 5 rigidly in position. The belt pulley 14 is fast on the shaft 5 between the fan 6 and the generator 8 and is directly above the pulley 15 on the crank shaft 16 of the engine. The belt 17 is driven by the pulley 15 and drives the pulley 14 to rotate the shaft 5, the belt, pulleys and shaft being of proper dimensions to suitably perform their functions.

As shown particularly in Fig. 3, the generator armature 18 is fast on the shaft 5, and is provided with two ball bearings 19 set in the end plates 20. The generator is supported from the engine as hereinbefore described, and the bearings 19 form the sole support for the shaft 5. It will also be understood that in this position the generator is readily accessible for inspection and repair.

As shown in the drawings, the pulleys 14 and 15 are of such relative diameters that the crank shaft 16 drives the shaft 5 at approximately 2.6 times engine speed, although this ratio may vary in practice from 2 to 3. The speed of the shaft 5 is not only suitable for the generator, but it is also suitable for the fan.

As a result of the organization herein described, the generator is located in the direct path of the air currents set up by the fan, and is, therefore, kept cool even though it be of comparatively small size for its output and speed. Furthermore, the usual bracket bearing for the shaft 5 is rendered unnecessary and its usual location is occupied by the generator. The driving belt, required in any case for driving the fan, also drives the generator, so that the additional gearing heretofore provided for obtaining the best generator speed is eliminated. Furthermore, by locating the generator in this way, more room is provided for all the auxiliary apparatus, and the whole organization is more accessible, is simplified, and operates more quietly and efficiently.

Having thus described my invention, what I claim is:

1. The combination with the internal combustion engine of an automobile, of a rotatable fan shaft extending forwardly of the engine in line therewith, an engine cooling fan mounted on the outer end of the shaft, an automobile lighting generator supported from the engine entirely behind the fan and having a driving connection with the inner end of the shaft, and gearing including an element mounted on the shaft between the fan and generator to drive them from the engine.

2. The combination with the internal combustion engine of an automobile, of a rotatable fan shaft extending forwardly of the engine in line therewith, an engine cooling fan mounted on the outer end of the shaft, an automobile lighting generator mounted on the inner end of the shaft entirely behind the fan, and a driving connection from the engine to the shaft to drive the fan and generator, the generator being supported from the engine and forming the sole support for the shaft and the fan.

In testimony whereof I affix my signature.

OTTO HEINS.